Feb. 9, 1926. 1,572,686
J. L. SCHERTZ
COMBINED SINK AND DISH WASHER
Filed Nov. 28, 1923 2 Sheets-Sheet 1

Inventor
Joseph L. Schertz
By Lancaster and Allwine
Attorneys

Feb. 9, 1926.  1,572,686
J. L. SCHERTZ
COMBINED SINK AND DISH WASHER
Filed Nov. 28, 1923   2 Sheets-Sheet 2
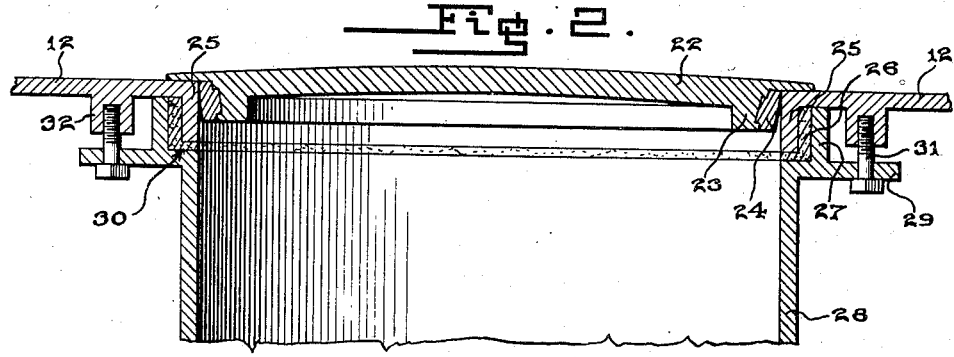
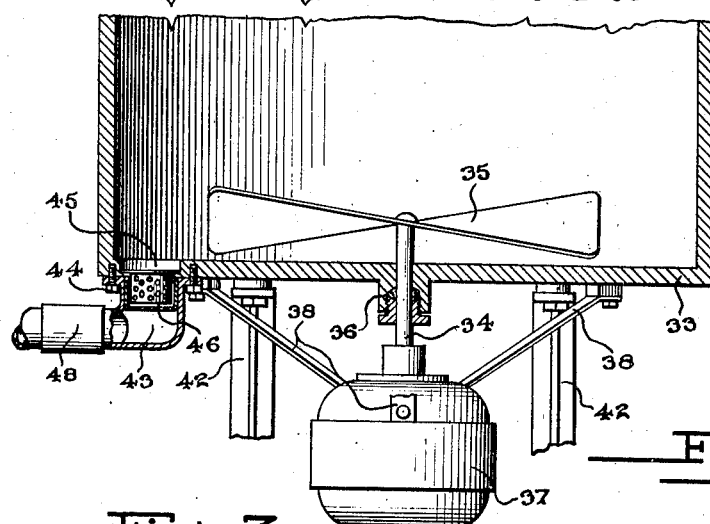
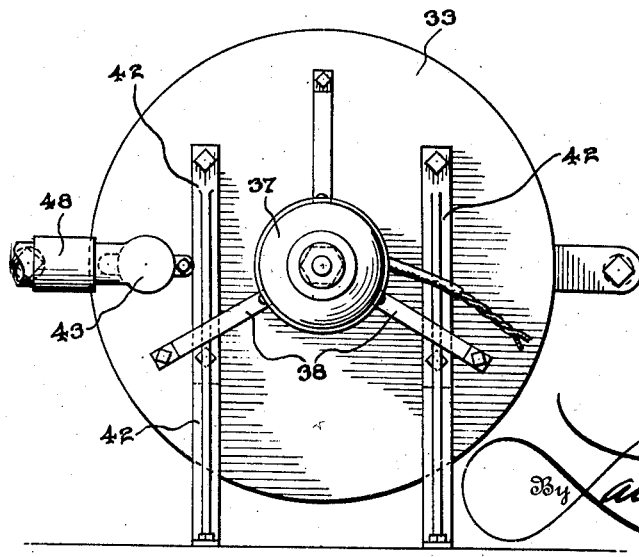
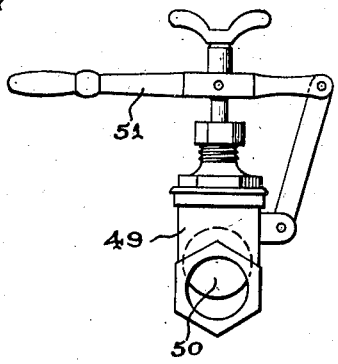
Inventor
Joseph L. Schertz
By Lancaster and Allwine
Attorneys Patented Feb. 9, 1926.

1,572,686

UNITED STATES PATENT OFFICE.

JOSEPH L. SCHERTZ, OF ST. LOUIS, MISSOURI.

COMBINED SINK AND DISH WASHER.

Application filed November 28, 1923. Serial No. 677,480.

*To all whom it may concern:*

Be it known that I, JOSEPH L. SCHERTZ, a citizen of the United States, residing at St. Louis, and State of Missouri, have invented certain new and useful Improvements in a Combined Sink and Dish Washer, of which the following is a specification.

The present invention relates to a kitchen appliance and more particularly to sinks and washing apparatus associated therewith.

An object of this invention is to provide a combined structure embodying a sink and also a dish washer utilizing to a large extent a single supporting structure, the same source of water supply, and the same drainage connection.

Another object of the invention is to so construct a sink and a dish washer that the operation of one will not interfere with the operation of the other after certain adjustments of a minor nature are made and wherein both the sink and the dish washer are in convenient positions of easy access which admit of an economical and compact installation.

A further object of the invention is to provide a sink with an opening in the bottom thereof and a cover for the opening so that the sink may be used in the ordinary manner, and to mount upon the sink beneath the opening a dish washer so that when the cover is removed the water supply for the sink may be utilized for filling the dish washer and the dishes, basket and other parts which may be used may be readily handled in and through the sink so as to be in the most desirable position and to thus catch all drippings from the parts of the washer and the dishes and prevent unnecessary labor in cleaning up the kitchen and the apparatus used.

The above and various other objects and advantages of this invention will in part be described in and in part be understood from the following detailed description of the present preferred embodiment, the same being illustrated in the accompanying drawings, wherein:

Fig. 2 is an enlarged fragmentary section through the dish washing device having the basket removed.

Fig. 3 is a bottom plan view of the dish washing machine.

Fig. 5 is a side elevation of the quick opening and closing valve for the drain of the dish washing machine.

Figure 1:
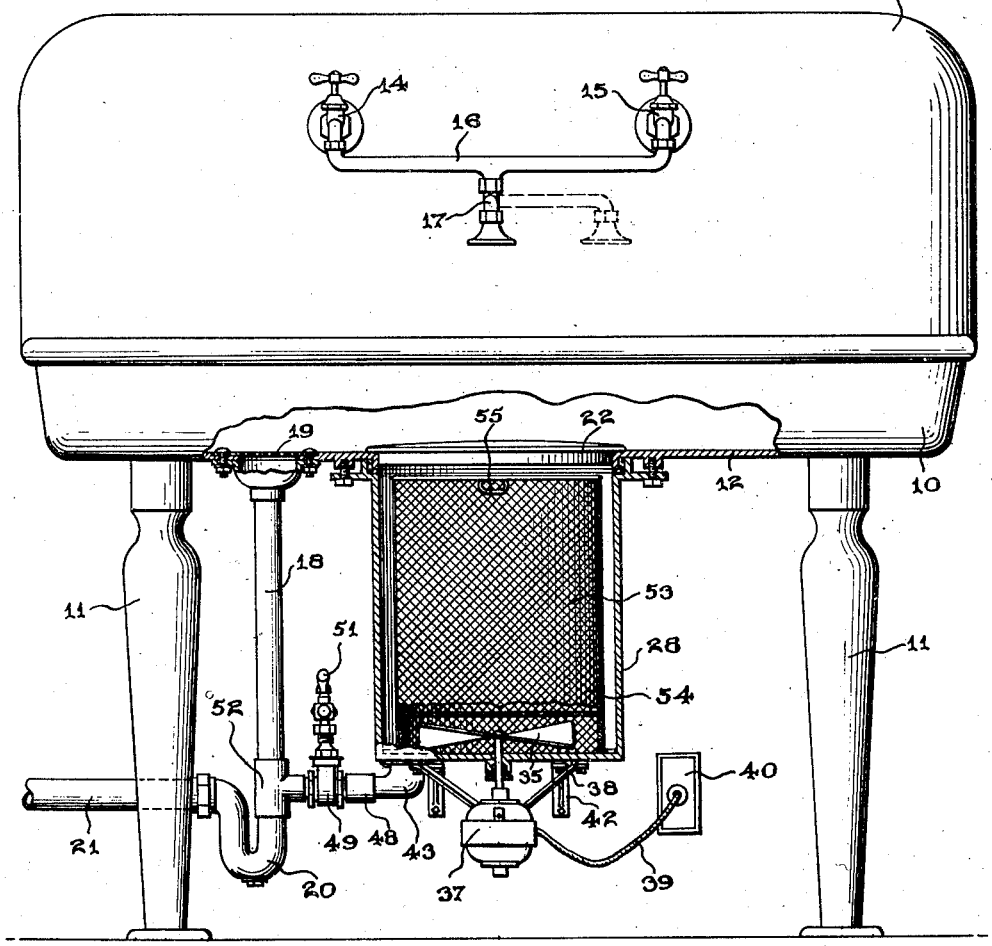
Fig. 1 is a front elevation partly in section of a combined sink and dish washing machine, constructed according to this invention.
Figure 4:
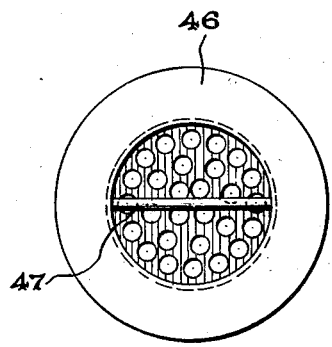
Fig. 4 is a detail top plan view of the strainer which is used in the outlet drain of the dish washing machine.

Referring to the drawings 10 designates a sink of usual construction which may be supported upon legs 11 and is provided with a bottom 12 and a suitable back or apron 13. Any suitable water supply fixtures may be used and in the present instance hot and cold water faucets 14 and 15 which project from the back 13 and may be connected together by a cross pipe 16 provided with a hinged outlet nozzle 17 adapted to be swung to one side such as shown in dotted lines in Fig. 1. The sink 10 has a drain pipe 18 which leads downwardly from a strainer 19 mounted in the bottom 12 preferably near one end of the sink, the drain pipe 18 being connected to a trap 20 which leads to the outlet pipe 21.

The bottom 12 of the sink is provided at preferably an intermediate point below the nozzle 17 with a large opening adapted to be closed by a cover plate 22 of suitable construction to fit over the opening and having a depending flange 23 which enters the opening and carries a suitable packing ring 24 adapted to bind in the opening of the bottom 12 and seal the cover 22 water tight therein. The sink may thus be used in the ordinary manner when the cover 22 is in place. The marginal edge of the bottom 10 about the central opening is preferably turned downwardly to form a depending flange 25 to provide an inner wall for the cover to seat against and an exterior wall for receiving a suitable sealing material, such as cement or the like 26 interposed between the flange 25 and an upstanding flange 27 which is carried upon the upper end of a container 28.

The container 28 forms the body part of a dish washer which may be constructed of metal or the like and having an outturned ledge 29 at its outer end from which rises the flange 27, the flange being spaced outwardly in offset relation from the wall of the container 28 to form a shoulder 30 opposite the lower edge of the flange 25. The packing 26 extends around the lower edge of the flange 25 to effectively seal the upper end of the container 28 against the bottom 12. The ledge 29 carries machine screws 31 or the like for engagement in bosses 32 which depend from the bottom 12 of the sink for supporting the container from the bottom.

The container 28 has a closed bottom 33 and is provided at its central portion with a shaft 34 which extends upwardly through the bottom and carries a paddle or fan 35 on its upper end and closely adjacent to the bottom 33. A stuffing box 36 is carried by the bottom 33 about the shaft 34 to seal the shaft through the bottom. An electric motor 37 is connected to the lower end of the shaft 34 for turning it and is suspended by arms 38 from the bottom 33. The motor 37 may be connected by an electric cord 39 to a wall outlet 40, and current to the motor 37 may be regulated and controlled from a switch 41 mounted above the back 13 of the sink and upon the wall. Of course any other suitable control means for the motor may be employed, and any other suitable means of propulsion of the shaft 34 may be resorted to.

The container 28 is not only suspended from the sink, but may also be supported upon a pair of brackets 42 or the like which are mounted upon the wall and which project outwardly beneath the container 28 as shown in the drawings.

The means for draining the container 28 comprises an elbow 43 which is flanged at its upper end and secured by screws 44 or the like against the lower side of the bottom 33 about a drain opening 45 which is formed in the bottom at one side of the container and preferably near the sink drain pipe 18. The elbow 43 carries in its upper end a removable strainer 46 having an outstanding flange adapted to suspend the strainer 46 in the top of the elbow 43, the strainer having a cross bar 47 therein adapted to be grasped by the fingers for lifting the strainer 46 out of the drain opening to clean out the strainer after the dish washer has been used. The elbow 43 is connected by a coupling 48 or the like to a valve 49 which, as shown particularly in Fig. 5, has a gate 50 and a hand lever 51 connected thereto for permitting the quick and complete shutting off and closing of the passage through the valve so that any accumulations or particles passing through the elbow 43 may be carried off without interruption through the valve 49.

The valve 49 is connected by a T 52 to the top of the trap 20 where it joins the sink drain pipe 18, the elbow 43, coupling 48 and valve 49 constituting a drain pipe for the dish washer.

Within the container 28 is concentrically arranged a reticulate basket 53 which is of reduced diameter as compared with the container 28 and which has a raised bottom 54 spaced sufficiently above the lower edge of the basket to accommodate the paddle 35 and to support dishes and the like placed in the basket above the paddle. The annular space about the basket 53 serves to receive the down current of water in the container after it has been forced upwardly by the paddle 35 and between and about the dishes and the like placed in the basket. The basket 53 may have one or more handles 55 thereon to facilitate the raising and lowering and otherwise handling of the basket.

When the device is used as a sink the cover 22 is fitted in the opening of the bottom 12, as above explained.

When it is desired to wash dishes or the like it is only necessary to remove the cover 22 and swing the nozzle 17 into position over the container 28 and fill the same to the desired surface level with water. The water may be added to the container before or after the dishes or other articles to be washed are placed in the container. The basket 53 is raised up through the sink and may rest upon the bottom of the sink or upon a drain board, or other suitable support while the dishes are being placed therein. The basket is now returned and the motor 37 set in operation to actuate the paddle 35. The paddle 35 agitates the water in the container 28 and may be driven at a suitable speed to force the water with the desired pressure against the dishes in the basket to remove the dirt and grease therefrom. It is apparent that water may be added from time to time during the operation and that the container 28 may be drained through the valve 49.

It is apparent that the water supply devices of any type for sinks may also be used for filling the container 28 and for flushing it out because the adjustable nozzle 17 and its cross pipe 16 are not essential although preferable and any water which is placed in the sink 10 will drain into the receptacle 28 when the cover 22 is open. The gate valve 50 forms a tight and positive seal between the trap 20 and the receptacle or container 28 to prevent any back flow of water through the pipe 18 and to also effectively close the drain pipe of the dish washing machine.

It is of course understood that various changes and modifications may be made in the details of construction and design of the above specifically described embodiment of the invention without departing from the spirit thereof, such changes and modifications being restricted by the scope of the following claim.

What is claimed is:

In combination with a receptacle having a large opening in its bottom bounded by a depending flange, a dish washer container below said opening and provided with an upstanding flange extending exteriorly about said flange of said receptacle, and a substantially flat cover plate provided with a packing ring for engagement with the wall of said opening to close said container and seal same against ingress of water.

JOSEPH L. SCHERTZ.